(12) United States Patent
Becker et al.

(10) Patent No.: US 10,152,740 B2
(45) Date of Patent: Dec. 11, 2018

(54) METHOD, MEDIUM, AND SYSTEM FOR IMPROVING HARDWARE EFFICIENCY IN GENERATING TRAVEL RECOMMENDATIONS

(71) Applicant: Amadeus S.A.S., Biot (FR)

(72) Inventors: Muriel Isabelle Becker, Grasse (FR); Guillaume Bertello, Antibes (FR); Benoit Dougoud, Dallas, TX (US); Matthieu Delost, Grasse Magagnosc (FR); David Pauchet, Pegomas (FR)

(73) Assignee: AMADEUS S.A.S., Biot (FR)

( * ) Notice: Subject to any disclaimer, the term of this patent is extended or adjusted under 35 U.S.C. 154(b) by 202 days.

(21) Appl. No.: 15/234,104

(22) Filed: Aug. 11, 2016

(65) Prior Publication Data

US 2018/0047084 A1 Feb. 15, 2018

(51) Int. Cl.
*G06Q 30/00* (2012.01)
*G06Q 30/06* (2012.01)
*G06Q 50/14* (2012.01)

(52) U.S. Cl.
CPC ......... *G06Q 30/0631* (2013.01); *G06Q 50/14* (2013.01)

(58) Field of Classification Search
CPC .......................... G06Q 30/0631; G06Q 50/14
See application file for complete search history.

(56) References Cited

U.S. PATENT DOCUMENTS

| | | |
|---|---|---|
| 8,135,601 B2 | 3/2012 | Bodin et al. |
| 2007/0073563 A1 | 3/2007 | Dourthe et al. |
| 2010/0010839 A1 | 1/2010 | Bodin et al. |
| 2010/0198628 A1* | 8/2010 | Rayner ............... G06Q 10/025 705/6 |

OTHER PUBLICATIONS https://techblog.expedia.com/2016/03/07/how-expedia-finds-flights-a-detailed-view/ (Year: 2016).*

* cited by examiner

*Primary Examiner* — Matthew E Zimmerman
(74) *Attorney, Agent, or Firm* — Thompson Hine LLP

(57) ABSTRACT

Methods, systems, and computer program products for generating recommendations. In response to receiving a request, the system generates a plurality of suggested recommendations for both a first bound and a second bound of a trip. The system stores the suggested recommendations corresponding to the first bound and the second bound in a memory, where the suggested recommendations corresponding to the second bound coincide to a subset of the suggested recommendations corresponding to the first bound published for display. The system publishes the suggested recommendations corresponding to the first bound for display to a user. In response to receiving an input that indicates a selected recommendation for the first bound, the system determines whether the selected recommendation is one of the subset of the suggested recommendations corresponding to the first bound.

19 Claims, 3 Drawing Sheets

| Reco | Outbound | | Inbound | | Total price |
|---|---|---|---|---|---|
| #1 | Flight NCE-PAR 9am | 60 EUR | Flight NCE-PAR 8pm | 80 EUR | 140 EUR |
| #2 | Flight NCE-PAR 9am | 70 EUR | Flight NCE-PAR 4pm | 40 EUR | 110 EUR |

FIG. 3

| Outbound | |
|---|---|
| Flight NCE-PAR 9am | 70 EUR |

FIG. 4

Outbound selected ⟶

| Outbound | |
|---|---|
| Flight NCE-PAR 9am | 70 EUR |

Inbound panel ⟶

| Inbound | |
|---|---|
| Flight NCE-PAR 8pm | 80 EUR |
| Flight NCE-PAR 4pm | 40 EUR |

FIG. 5

METHOD, MEDIUM, AND SYSTEM FOR IMPROVING HARDWARE EFFICIENCY IN GENERATING TRAVEL RECOMMENDATIONS

TECHNICAL FIELD

The invention generally relates to computers and computer software, and in particular to methods, systems, and computer program products generating recommendations for an itinerary having multiple bounds.

BACKGROUND

Computer technology is increasingly used in the travel industry to manage, support, book, reserve, and process travel reservations as well as data associated therewith. Generally, third party reservation agents (i.e., travel agents) or travelers book flights based on fare structures established by various airlines. The approaches used to calculate the fares charged by an airline may be complex, and it should be appreciated that a single flight may charge various passengers different prices for similar seats. For example, business travelers may be charged more for a particular flight than individuals who are traveling for pleasure on the same exact flight, since individuals traveling for pleasure tend to be more flexible about flight restrictions. Indeed, there are several considerations that travelers consider when booking flights such as, for example, the dates of travel, featured services, and the various sequences of flights between an origin and a destination.

In one approach to present various travel recommendations to reservation agents and travelers, flight information may be presented based on a calendar display. In this approach, the least expensive flight that departs each day is displayed for a range of dates. Alternatively, a travel board may be generated, which displays all of the available flights between a particular origin and destination for a specific day. Specifically, the travel board may list the least expensive price available for each flight, as well as other more expensive prices that correspond to different fare families for the same flight that may offer greater flexibility or amenities. A fare family is a group of fares having the same characteristics and amenities such as, for example, terms and conditions, meals, seating, possibility of date change, and cancellation fees.

In one particular approach, various fares may be presented using a travel board or a calendar display, and are grouped based on a one-way display mode. The one-way display lists departing or outbound flights separately from incoming or inbound flights. The fares and flights proposed for inbound flights are dependent on the fare and flight selected by the traveler for the outbound flight. As a result, all combinations of possible outbound and inbound flights need to be computed by the system. Although the one-way display offers many advantages, this approach also generates only a limited number of travel recommendations. Furthermore, an airline's inventory system may be polled multiple times to retrieve information to generate both the calendar and the travel board display.

In another approach, fares may be presented utilizing the travel board or the calendar display based on a one-way combinable mode. It should be appreciated that a fare marked as one-way combinable may be combined with another one-way combinable fare. In contrast, a fare marked as non-combinable may not be combined with some other fares. Furthermore, two or more one-way combinable fares may be used to create a round trip booking, or to create a one-way trip including multiple flight segments. When using the one-way combinable approach, the search for available flights may be segmented by either inbound or outbound flight. Specifically, a traveler may select his or her outbound flight independently from the inbound flight, which results in an increased number of travel recommendations that may be presented at one time to a traveler. This is because the system does not need to compute all of the possible combinations in advance. However, airlines need to adhere to strict filing guidelines in order to ensure that all of the travel recommendations presented to a traveler are combinable between inbound and outbound flights.

Thus, improved methods, systems, and computer program products for exchanging travel recommendations are needed that improve the efficiency of generating recommendations for an itinerary having multiple bounds.

SUMMARY

In an embodiment of the invention, a system for generating recommendations for a trip is disclosed. The system includes at least one processor and a memory coupled to the processors, and the memory storing data comprising program code that, when executed by the one or more processors, causes the system to receive a request for the trip, where the trip includes at least a first bound and a second bound. In response to receiving the request, the system generates a plurality of suggested recommendations corresponding to both the first bound and the second bound of the trip. The system stores the suggested recommendations corresponding to the first bound and the second bound in a memory, where the suggested recommendations corresponding to the second bound coincide to a subset of the suggested recommendations corresponding to the first bound published for display. The system publishes the suggested recommendations corresponding to the first bound for display to a user. In response to receiving an input that indicates a selected recommendation for the first bound, the system determines whether the selected recommendation is one of the subset of the suggested recommendations corresponding to the first bound. In response to the selected recommendation being one of the recommendations of the subset of recommendations, the system retrieves the suggested recommendations corresponding to the second bound from the memory. The system publishes the suggested recommendations corresponding to the second bound for display to the user.

In one embodiment, in response to the selected recommendation being different than one of the recommendations of the subset of recommendations, the system calculates another set of recommendations for the second bound that correspond to the selected recommendation for the first bound, and publishes the another set of recommendations for the second bound for display to the user.

In one embodiment, the subset of the suggested recommendations corresponding to the first bound is based on a percentage of instances when the suggested recommendations corresponding to the second bound from the memory are published instantaneously in response to receiving the input that indicates the selected recommendation for the first bound. In another embodiment, the program code, when executed by the one or more processors, further causes the system to determine a quantity. The quantity represents a number of the recommendations corresponding to the second bound that need to be determined such that the suggested recommendations corresponding to the second bound from the memory are published instantaneously in response to receiving the input that indicates a selected recommendation for the first bound.

In yet another embodiment, the program code, when executed by the one or more processors, further causes the system to store the suggested recommendations corresponding to the first bound and the second bound to the memory for a predetermined amount of time. The predetermined amount of time is adjustable. In another embodiment, the predetermined amount of time is based on an average time of a conversation with the user on a website and a volatility of availability data for the trip.

In still another embodiment, the first bound an outbound portion of the trip, the second bound is an inbound portion of the trip, and the trip is a round-way trip.

In one embodiment, the program code, in response to receiving another input that indicates another selected recommendation for the second bound, the system updates the suggested recommendations corresponding to the first bound that are published for display to the user.

In another embodiment, the selected recommendation for the first bound is saved to the memory as a specific key.

In another embodiment of the invention, a method of generating recommendations for a trip is disclosed. The method includes receiving, by a computer, a request for the trip. The trip includes at least a first bound and a second bound. In response to receiving the request, the method includes generating, by the computer, a plurality of suggested recommendations for both the first bound and the second bound of the trip. The method further includes storing the suggested recommendations corresponding to the first bound and the second bound in a memory of the computer. The suggested recommendations corresponding to the second bound coincide to a subset of the suggested recommendations corresponding to the first bound published for display. The method also includes publishing the suggested recommendations corresponding to the first bound for display to a user. In response to receiving an input that indicates a selected recommendation for the first bound, the method includes determining, by the computer, whether the selected recommendation is one of the subset of the suggested recommendations corresponding to the first bound. In response to the selected recommendation being one of the recommendations of the subset of recommendations, the method includes retrieving the suggested recommendations corresponding to the second bound from the memory of the computer. Finally, the method includes publishing the suggested recommendations corresponding to the second bound for display to the user.

In another embodiment of the invention, a computer program product is provided for generating recommendations for a trip, the computer program product comprising a non-transitory computer-readable storage medium and program code stored on the non-transitory computer-readable storage medium that, when executed by one or more processors, causes the one or more processors to receive a request for the trip. The trip includes at least a first bound and a second bound. In response to receiving the request, the system may be further caused to generate a plurality of suggested recommendations for both the first bound and the second bound of the trip. The system may be further caused to store the suggested recommendations corresponding to the first bound and the second bound in a memory. The suggested recommendations corresponding to the second bound coincide to a subset of the suggested recommendations corresponding to the first bound published for display. The system may be further caused to publish the suggested recommendations corresponding to the first bound for display to a user. In response to receiving an input that indicates a selected recommendation for the first bound, the system may be further caused to determine whether the selected recommendation is one of the subset of the suggested recommendations corresponding to the first bound. In response to the selected recommendation being one of the recommendations of the subset of recommendations, the system may be further caused to retrieve the suggested recommendations corresponding to the second bound from the memory of the computer. The system may be further caused to publish the suggested recommendations corresponding to the second bound for display to the user.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

BRIEF DESCRIPTION OF THE DRAWINGS

The accompanying drawings, which are incorporated in and constitute a part of this specification, illustrate various embodiments of the invention and, together with the general description of the invention given above, and the detailed description of the embodiments given below, serve to explain the embodiments of the invention.

FIG. 3 is an exemplary illustration of two round-way trips that may be calculated by the operating environment shown in FIG. 1 for a single fare family.

FIG. 4 is an exemplary illustration of an outbound travel board that may be published for display upon the user interface shown in FIG. 1.

FIG. 5 is an exemplary illustration of the outbound travel board and an inbound travel board that may be published for display upon the user interface shown in FIG. 1.

DETAILED DESCRIPTION

Figure 1:
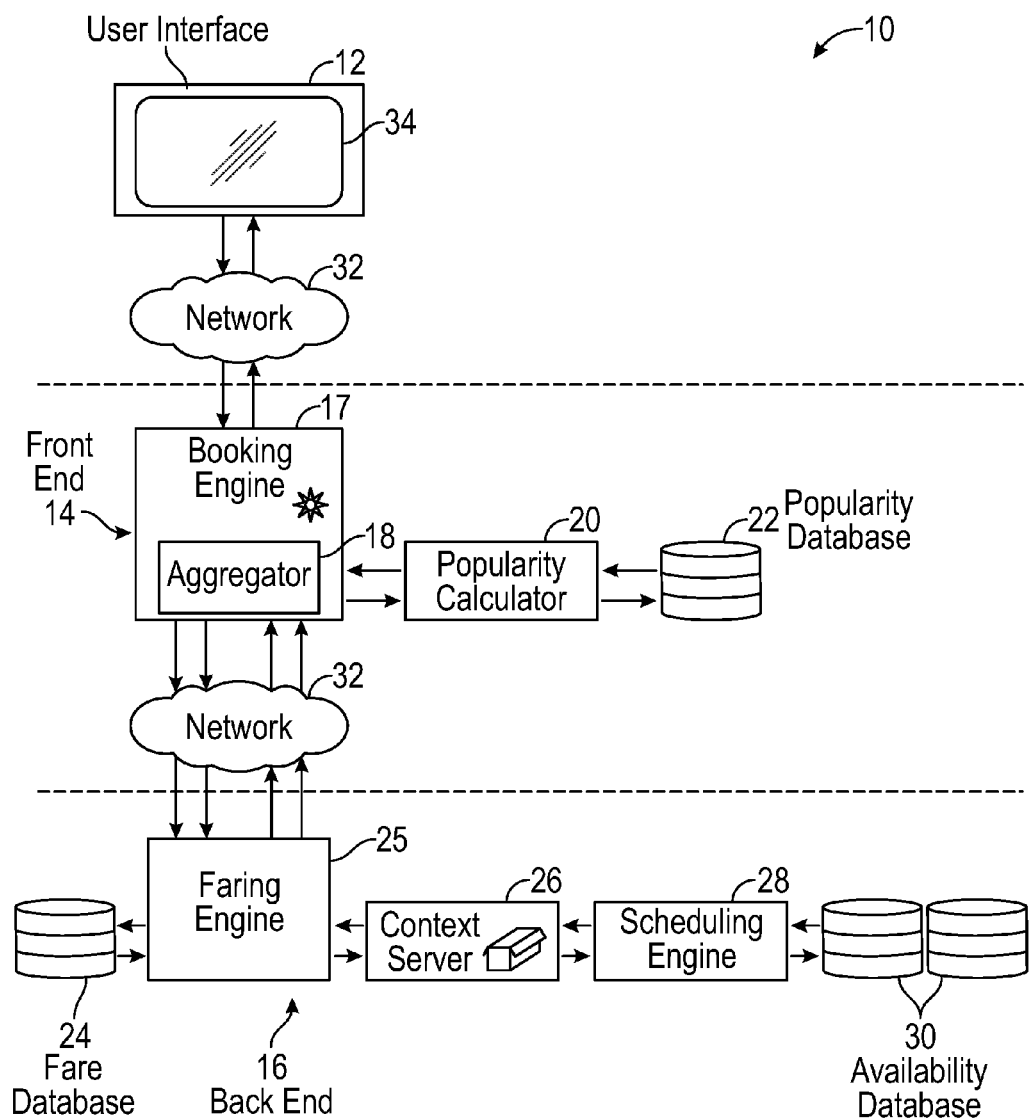
FIG. 1 is a diagrammatic view of an exemplary operating environment for generating recommendations for a travel itinerary having two or more bounds, the operating environment including a user interface, a front end, and a back end in communication with one another via a network.

Referring now to FIG. 1, an operating environment 10 in accordance with an embodiment of the invention may include a user interface 12, a front end 14, and a back end 16. The front end 14 of the operating environment 10 may include a booking engine 17, an aggregator 18, a popularity calculator 20, and a popularity database 22. The back end 16 of the operating environment 10 may include a fare database 24, a faring engine 25, a context server 26, a scheduling engine 28, and one or more availability databases 30. The user interface 12 may be in communication with the front end 14, and the front end 14 may be in communication with the back end 16 through a network 32. The network 32 may include one or more private or public networks (e.g., the Internet) that enable the exchange of data.

The user interface 12 may provide end users with an interface for accessing the front end 14 of the operating environment 10 that enables end users to search for and book travel itineraries. In one embodiment, the end user may be a traveler or a recommendation agent. The user interface 12 may comprise a desktop computer, laptop computer, tablet computer, smart phone, or any other suitable computing device. The end user may employ the user interface 12 to search for and book travel services by accessing the front end 14 though the network 32. The user interface 12 may also include an application accessible by the end user that enables the end user to search for and book travel itineraries. This application may comprise, for example, a travel-related website that is accessible over the network 32 using a web-browser provided by the user interface 12.

As explained in greater detail below, one or more suggested recommendations for a travel itinerary may be published upon a screen or display 34 of the user interface 12 for display to an end user. The suggested recommendations may be based on various travel attributes indicated by the end user. Some examples of travel attributes include, but not limited to, departure dates, departure times, fare family, and price. Those of ordinary skill in the art will readily appreciate that a fare family may be a specific group of fares with the same characteristics and amenities such as, but not limited to, terms and conditions, possibility of date change, and cancellation fees.

In the exemplary embodiments as described in the present disclosure, the travel itinerary is a round-way trip having two bounds, namely an outbound portion and an inbound portion. For example, the exemplary embodiments as described below and illustrated in FIGS. 3-5 are for a round-way trip from Nice to Paris, which is the outbound portion, and from Paris back to Nice, which is the inbound portion. However, it is to be appreciated that the operating environment 10 is not limited to only generating suggested recommendations for round-way trips. Instead, the disclosed operating environment 10 may be used to provide suggested recommendations for any travel itinerary having two or more bounds. Furthermore, it should also be appreciated that while the disclosed embodiments describe first providing suggested recommendations for an outbound portion of an itinerary to a traveler and then subsequently providing suggested recommendations for an inbound portion of the itinerary to the traveler based a on particular outbound flight that is selected by the end user, in an alternative embodiment the operating environment 10 may also provide the inbound portion of the itinerary first. Finally, it should also be appreciated that while the exemplary embodiments describe the purchase of airline tickets, the disclosed approach may be used to provide suggested recommendations for any other mode of travel having two or more bounds such as, for example, railway travel.

The front end 14 of the operating environment 10 may be accessed by travel agents and travelers by the user interface 12 through the network 32. As seen in FIG. 1, the booking engine 17 includes the aggregator 18. The aggregator 18 may receive a request from an end user from the user interface 12 through the network 32 for suggested recommendations for a particular travel itinerary having two or more bounds. The request may include, for example, an origin, a destination, departure dates, and departure times. As explained in greater detail below, a plurality of suggested outbound flights based on the request may first be published for display to the user upon the display 34 of the user interface 12. Then, once the end user selects a particular outbound flight, then a plurality of suggested inbound flights that correspond to the selected outbound flight may be published for display. Furthermore, as explained below and shown in FIGS. 3-5, once an end user selects one of the inbound flights, a bound update may be performed in order to refresh the outbound flights that are displayed.

In response to receiving the request from the end user for the travel itinerary, the aggregator 18 may communicate with the popularity calculator 20 to determine a percentage of instances when a plurality of suggested recommendations for inbound flights are displayed instantaneously upon the display 34 of the user interface 12 in response to a particular outbound flight being selected by the end user. In one exemplary embodiment, fifty suggested recommendations for an outbound flight may be published upon the display 34 of the user interface 12 in response to receiving the request from the end user. Specifically, the fifty outbound flights may be presented by a travel board, which displays all of the available flights between the particular origin and destination for the departure date as indicated by the request. As determined by statistical analysis using the information stored in the popularity database 22, it is predicted that an end user selects one of the first three outbound flights that are published upon the travel board ninety percent of the time. Accordingly, the percentage of instances when a plurality of inbound flights are displayed instantaneously upon the display 34 of the user interface 12 in response to a particular set of outbound flights being selected by the end user is ninety percent. Thus, if an end user selects one of the top three outbound flights, then the available inbound flights may be instantaneously published upon the display 34 of the user interface 12 ninety percent of the time.

In the remaining ten percent of instances when an end user does not select one of the top three outbound flights, then the available inbound flights are subsequently computed. It is to be appreciated that the percentage of inbound flights being displayed instantaneously may be based on a number of factors such as, for example, a particular travel provider (e.g., specific airline), office identifier, the end user's origin and destination, and the airline website profile.

It is to be appreciated that every time an outbound flight suggestion is selected by an end user, the selection may be saved to the popularity database 22. The selected outbound flight may be saved in the popularity database 22 as a specific key. The specific key may indicate various characteristics of the selected outbound flight such as, for example, origin, destination, and office identifier of the selected outbound flight. For example, if the end user is presented with a list of outbound flights from Nice to Paris, and selects the second flight that is listed, then the specific key may include identifiers such as Origin=NCE, Destination=Paris, and Office ID=PARAF08AA.

Continuing to refer to FIG. 1, once the percentage of instances when the inbound flights are displayed instantaneously based on a selected outbound flight is determined, then the aggregator 18 may communicate with the popularity calculator 20 as well as the faring engine 25 simultaneously in parallel. Specifically, the aggregator 18 communicates with the popularity calculator 20 to determine a quantity or number n of inbound flights, which is based on the percentage of instances when the inbound flights are displayed instantaneously based on a selected outbound flight. The number n represents the number of recommended inbound flights that need to be calculated by the scheduling engine 28 such that the inbound flights may be instantaneously displayed ninety percent of the time. Specifically, the popularity calculator 20 and the popularity database 22 receive as input from the aggregator 18 the percentage of instances when the inbound flights are displayed instantaneously based on a selected outbound flight (e.g., 90%). The popularity calculator 20 generates the number n of inbound flights as an output.

It is to be appreciated that the popularity calculator 20 may be called upon both asynchronously and synchronously. Specifically, the popularity calculator 20 is called asynchronously when an outbound flight recommendation is stored within the popularity database 22, and synchronously when the aggregator 18 needs to know the number n of inbound flights based on the percentage of instances when the inbound flights are displayed instantaneously based on a selected outbound flight.

In addition to calculating the number n by the popularity calculator 20, the aggregator 18 also communicates with the faring engine 25 to generate a synchronous request to determine the outbound flights that may be published upon the display 34 of the user interface 12 for display to the end user. Specifically, in response to receiving the synchronous request from the aggregator 18, the faring engine 25 may determine the plurality of outbound flights, and sends a reply to the aggregator 18. The outbound flights are also send to the context server 26, where they are saved in memory.

In addition to obtaining the outbound flights, the faring engine 25 also simultaneously calculates the inbound flights that are instantaneously displayed to an end user as well. For example, in the embodiment as described the aggregator 18 may send an asynchronous request to the faring engine 25 to calculate the inbound flights that are immediately published to the display 34 of the user interface 12 in response to an end user selecting one of the top three outbound flights that are listed. That is, the inbound flights coincide with a subset of the suggested outbound flights that are published to the display 34 of the user interface 12. The inbound flights are then saved to the context server 26. It is to be appreciated the synchronous requests for outbound flights are available for instantaneous display. However, the asynchronous requests for the inbound flights that are published immediately are returned to the faring engine 25 as soon as they are available using Ajax mechanisms. Those of ordinary skill in the art readily appreciate that Ajax is a mechanism used to update a displayed webpage without the need to completely reload the webpage.

It is to be appreciated that the context server 26 may be used to store all flight-related information in regards to both the inbound flights as well as the outbound flights. In particular, in order to avoid recalculating data in subsequent transactions, the context server 26 may be used to store the inbound flights that are immediately published upon the display 34 of the user interface 12 for display to the end user. It is to be appreciated that the context server 26 may avoid polling redundancy between the various steps that are used to present travel recommendations to the end user. Polling is generally expensive in terms of response time and granular financial cost for a travel provider, such as an airline.

The context server 26 may store the flight-related information for a predetermined amount of time, which may be referred to as time to live (TTL). Those of ordinary skill in the art will readily appreciate that TTL limits the lifespan or lifetime of data in a computer or network. TTL may be implemented as a counter or timestamp attached to or embedded in data. In one exemplary embodiment, the TTL may be set to ten minutes, however the TTL value may be adjusted based on the average time of an end user's conversation on the travel provider's website, and the volatility of the flight availability data. It should also be appreciated that in order to handle larger flight domains, the context server 26 may employ software packages such as, for example, COUCHBASE. Those of ordinary skill in the art will readily appreciate that a COUCHBASE Server is a non-Structured Query Language (NoSQL) document database having a distributed architecture for performance, scalability, and availability.

Figure 2:
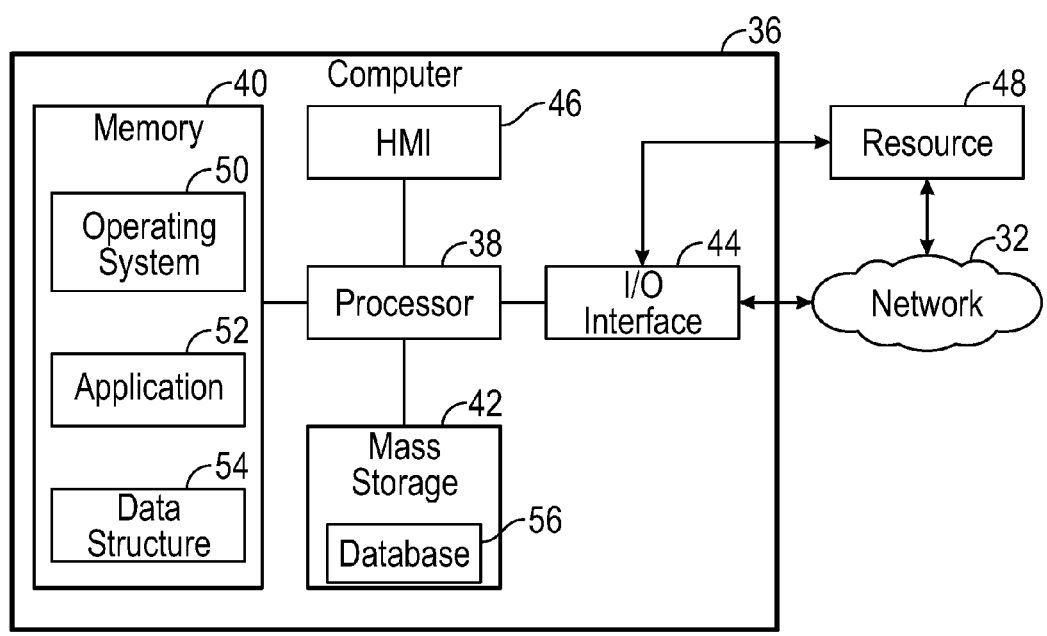
FIG. 2 is a diagrammatic view of an exemplary computer system of FIG. 1.

Referring now to FIG. 2, the user interface 12, the front end 14, and the back end 16 of operating environment 10 may be implemented on one or more computer devices or systems, such as exemplary computer system 40. The computer system 40 may include a processor 42, a memory 44, a mass storage memory device 46, an input/output (I/O) interface 48, and a Human Machine Interface (HMI) 50. The computer system 40 may also be operatively coupled to one or more external resources 52 via the network 32 or I/O interface 48. External resources may include, but are not limited to, servers, databases, mass storage devices, peripheral devices, cloud-based network services, or any other suitable computer resource that may be used by the computer system 40.

The processor 42 may include one or more devices selected from microprocessors, micro-controllers, digital signal processors, microcomputers, central processing units, field programmable gate arrays, programmable logic devices, state machines, logic circuits, analog circuits, digital circuits, or any other devices that manipulate signals (analog or digital) based on operational instructions that are stored in the memory 44. Memory 44 may include a single memory device or a plurality of memory devices including, but not limited to, read-only memory (ROM), random access memory (RAM), volatile memory, non-volatile memory, static random access memory (SRAM), dynamic random access memory (DRAM), flash memory, cache memory, or any other device capable of storing information. The mass storage memory device 46 may include data storage devices such as a hard drive, optical drive, tape drive, volatile or non-volatile solid state device, or any other device capable of storing information.

The processor 42 may operate under the control of an operating system 56 that resides in memory 44. The operating system 56 may manage computer resources so that computer program code embodied as one or more computer software applications, such as an application 58 residing in memory 44, may have instructions executed by the processor 42. In an alternative embodiment, the processor 42 may execute the application 58 directly, in which case the operating system 56 may be omitted. One or more data structures 60 may also reside in memory 44, and may be used by the processor 42, operating system 56, or application 58 to store or manipulate data.

The I/O interface 48 may provide a machine interface that operatively couples the processor 42 to other devices and systems, such as the network 32 or external resource 52. The application 58 may thereby work cooperatively with the network 32 or external resource 52 by communicating via the I/O interface 48 to provide the various features, functions, applications, processes, or modules comprising embodiments of the invention. The application 58 may also have program code that is executed by one or more external resources 52, or otherwise rely on functions or signals provided by other system or network components external to the computer system 40. Indeed, given the nearly endless hardware and software configurations possible, persons having ordinary skill in the art will understand that embodiments of the invention may include applications that are located externally to the computer system 40, distributed among multiple computers or other external resources 52, or provided by computing resources (hardware and software) that are provided as a service over the network 32, such as a cloud computing service.

The HMI 50 may be operatively coupled to the processor 42 of computer system 40 in a known manner to allow a user to interact directly with the computer system 40. The HMI 50 may include video or alphanumeric displays, a touch screen, a speaker, and any other suitable audio and visual indicators capable of providing data to the user. The HMI 50 may also include input devices and controls such as an alphanumeric keyboard, a pointing device, keypads, push-buttons, control knobs, microphones, etc., capable of accepting commands or input from the user and transmitting the entered input to the processor 42.

A database 54 may reside on the mass storage memory device 46, and may be used to collect and organize data used by the various systems and modules described herein. The database 54 may include data and supporting data structures that store and organize the data. In particular, the database 54 may be arranged with any database organization or structure including, but not limited to, a relational database, a hierarchical database, a network database, or combinations thereof. A database management system in the form of a computer software application executing as instructions on the processor 42 may be used to access the information or data stored in records of the database 54 in response to a query, where a query may be dynamically determined and executed by the operating system 56, other applications 58, or one or more modules.

FIG. 3 is an exemplary illustration of two travel recommendations for a round-trip from Nice to Paris, and back from Paris to Nice for a particular fare family. As seen in FIG. 3, both travel recommendations #1 and #2 both include an outbound flight as well as a corresponding inbound flight. The same outbound flight from Nice to Paris at 9:00 am costs 60 € when combined with the inbound NCE-PAR flight at 8:00 pm and 70 € when combined with the inbound NCE-PAR flight at 4 pm. However, as seen in FIG. 3, the total price for the first travel recommendation is 140 € while the total price for the second travel recommendation is 110 €. Thus, it is to be appreciated that while the first travel recommendation includes the lower price, the second travel recommendation actually offers the lowest overall price.

Continuing to refer to FIG. 3, the first inbound flight from Paris to Nice at 8 pm is 80 € and the second inbound flight from Paris to Nice at 4 pm is 40 €. Thus, it should also be appreciated that the travel recommendations are both built based on the same outbound flight, but have different inbound flights. Referring now to both FIGS. 1 and 3, the faring engine 25 may communicate with the scheduling engine 28 of the back end 16 of the operating environment 10 to perform a bound calculation. The bound calculation determines the least expensive travel recommendation for each fare family based on the overall price of an itinerary. In other words, the bound calculation determines the least expensive recommendation while taking into account all of the bounds for a particular trip, and not the least expensive bound price with consideration to all fare families. For example, in the embodiment as shown in FIG. 3, the second travel recommendation is selected since it offers the least expensive price overall. Accordingly, the front end 14 only communicates the second outbound flight from Nice to Paris costing 70 € to the user interface 12 for each fare family.

FIG. 4 is an illustration of the display 34 of the user interface 12, which publishes the second outbound flight for display to the end user using the travel provider's website as part of an outbound travel board. It is to be appreciated that while a single outbound flight is illustrated in FIG. 1, the least expensive fare for each fare family for each flight may be published upon the travel board. Turning back to FIGS. 1 and 3, in response to receiving an indiction that the end user has selected a specific outbound flight, the faring engine 25 may communicate with the context server 26 and the scheduling engine 28 of the back end 16 of the operating environment 10 and perform a bound update to determine the inbound flights that correspond to the selected outbound flight. Specifically, as explained above, if one of the three most popular outbound flights are selected, then the faring engine 25 may retrieve the saved corresponding inbound flights from the context server 26. However, if the end user does not select one of the top three outbound flights, then the scheduling engine 28 may calculate the corresponding flights.

It is to be appreciated that in order to provide as many options as possible to an end user, a bound update may be performed every time an end user selects a particular bound. Specifically, the bound update is performed in response to the end user selecting either an outbound or an inbound flight. The bound update determines a plurality of flights that correspond to either the selected inbound or outbound flight. For example, if the outbound flight is selected, then the bound updates determines the corresponding inbound flights.

As seen in FIG. 5, a travel panel that includes all of the inbound flights that correspond to the selected outbound flight, as well as the outbound flight are published for display. Referring to FIGS. 1, 3, and 5, both of the inbound travel recommendations that are shown in FIG. 3 may be published for display to the end user. The second inbound flight shown in FIG. 5 corresponds to the second travel recommendation shown in FIG. 3. In other words, the second inbound flight shown in FIG. 5 corresponds to the outbound flight having a price of 70 €. Thus, if the end user selects the second inbound flight as shown in FIG. 5, then there is no need to update the pricing of either the outbound or the inbound flight, since the selected inbound flight corresponds to the outbound flight that was already selected. However, if the end user selects the first inbound flight shown in FIG. 5, then a refresh may be required in order to ensure that the end user is charged the lowest price possible. In the embodiment as described and illustrated in FIGS. 3-5, the lowest price possible for the round-way trip is 110 €.

The refresh may be performed by either adjusting the price of the selected outbound flight, or instead by updating the price of the inbound flight. Specifically, in the embodiment as shown in FIG. 5, the price of the outbound flight may be refreshed from 70 € to 60 €. It is to be appreciated that the price of the outbound flight is adjustable, since both the first outbound flight and the second outbound flight shown in FIG. 3 are the same. Alternatively, in another approach the price of the inbound flight may be refreshed from 80 € to 70 €. However, it is to be appreciated that either approach still results in the same overall price for a round-way trip.

Another bound update may also be performed in response to the end user selecting either the first inbound flight or the second inbound flight. This bound update may be used to update the outbound flights that are listed upon the travel panel. Specifically, the bound update is performed to refresh the travel panel with the outbound flights that correspond to the inbound flight that is selected by the user. For example, in the embodiment as shown in FIG. 3-5, the outbound flight is compatible with both the first and the second inbound flight. Thus, the travel panel for the outbound flights may stay the same in this particular embodiment. However, it is to be appreciated that in the event multiple numerous outbound flights that correspond to the selected inbound flight are available, then performing a bound update in order to refresh or update the corresponding outbound flights may be highly beneficial. For example, in some types of configurations only a limited number of flights may be published for display to a user. In particular, one type of pricing scheme allows for only fifty outbound and inbound flights to be published for display. This means that at the bound calculation step, up to fifty potential outbound flights may be displayed. However, there may be more flights that are actually available, but only fifty outbound flights may be displayed at a time. After the second bound update is performed on the outbound flights, then the outbound flights may be updated to show more outbound flights that are compatible with the selected inbound flight, but were not initially published for display.

Referring generally to the figures, the disclosed system improves the overall efficiency of processing data associated with creating travel recommendations for two or more bounds of a trip, and also solves a problem that is rooted in computer technology. Indeed, the disclosed system addresses some of the issues encountered by a one-way display, which only generates only a limited number of travel recommendations and also polls an airline's inventory system multiple times to retrieve information to generate both the calendar and the travel board display. Specifically, the disclosed system performs a bound update, which provides an end user with an increased number of travel solutions. Moreover, the disclosed system also stores flight information in the context server, which reduces the need for polling. Furthermore, the disclosed system also addresses some of the issues encountered when using the one-way combinable approach, where an end user selects each bound of a travel itinerary independently from one another. Indeed, the disclosed system allows for an end user to book both bounds together, where travel recommendations may be generated based on a selected inbound or outbound flight. Finally, it should also be appreciated that the disclosed system may provide an end user with the least expensive travel recommendation for each fare family, which enhances customer satisfaction and maximizes revenue for a travel provider.

In general, the routines executed to implement the embodiments of the invention, whether implemented as part of an operating system or a specific application, component, program, object, module or sequence of instructions, or even a subset thereof, may be referred to herein as "computer program code," or simply "program code." Program code typically comprises computer-readable instructions that are resident at various times in various memory and storage devices in a computer and that, when read and executed by one or more processors in a computer, cause that computer to perform the operations necessary to execute operations and/or elements embodying the various aspects of the embodiments of the invention. Computer-readable program instructions for carrying out operations of the embodiments of the invention may be, for example, assembly language or either source code or object code written in any combination of one or more programming languages.

Various program code described herein may be identified based upon the application within that it is implemented in specific embodiments of the invention. However, it should be appreciated that any particular program nomenclature that follows is used merely for convenience, and thus the invention should not be limited to use solely in any specific application identified and/or implied by such nomenclature. Furthermore, given the generally endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the embodiments of the invention are not limited to the specific organization and allocation of program functionality described herein.

The program code embodied in any of the applications/modules described herein is capable of being individually or collectively distributed as a program product in a variety of different forms. In particular, the program code may be distributed using a computer-readable storage medium having computer-readable program instructions thereon for causing a processor to carry out aspects of the embodiments of the invention.

Computer-readable storage media, which is inherently non-transitory, may include volatile and non-volatile, and removable and non-removable tangible media implemented in any method or technology for storage of information, such as computer-readable instructions, data structures, program modules, or other data. Computer-readable storage media may further include RAM, ROM, erasable programmable read-only memory (EPROM), electrically erasable programmable read-only memory (EEPROM), flash memory or other solid state memory technology, portable compact disc read-only memory (CD-ROM), or other optical storage, magnetic cassettes, magnetic tape, magnetic disk storage or other magnetic storage devices, or any other medium that can be used to store the desired information and which can be read by a computer. A computer-readable storage medium should not be construed as transitory signals per se (e.g., radio waves or other propagating electromagnetic waves, electromagnetic waves propagating through a transmission media such as a waveguide, or electrical signals transmitted through a wire). Computer-readable program instructions may be downloaded to a computer, another type of programmable data processing apparatus, or another device from a computer-readable storage medium or to an external computer or external storage device via a network.

Computer-readable program instructions stored in a computer-readable medium may be used to direct a computer, other types of programmable data processing apparatus, or other devices to function in a particular manner, such that the instructions stored in the computer-readable medium produce an article of manufacture including instructions that implement the functions, acts, and/or operations specified in the flow charts, sequence diagrams, and/or block diagrams. The computer program instructions may be provided to one or more processors of a general purpose computer, a special purpose computer, or other programmable data processing apparatus to produce a machine, such that the instructions, which execute via the one or more processors, cause a series of computations to be performed to implement the functions, acts, and/or operations specified in the flow charts, sequence diagrams, and/or block diagrams.

In certain alternative embodiments, the functions, acts, and/or operations specified in the flow charts, sequence diagrams, and/or block diagrams may be re-ordered, processed serially, and/or processed concurrently consistent with embodiments of the invention. Moreover, any of the flow charts, sequence diagrams, and/or block diagrams may include more or fewer blocks than those illustrated consistent with embodiments of the invention.

The terminology used herein is for the purpose of describing particular embodiments only and is not intended to be limiting of the embodiments of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Furthermore, to the extent that the terms "includes", "having", "has", "with", "comprised of", or variants thereof are used in either the detailed description or the claims, such terms are intended to be inclusive in a manner similar to the term "comprising".

While all of the invention has been illustrated by a description of various embodiments and while these embodiments have been described in considerable detail, it is not the intention of the Applicant to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the spirit or scope of the Applicant's general inventive concept.

What is claimed is:

1. A system comprising:
   at least one processor; and
   a memory coupled to the one or more processors, the memory storing data comprising program code that, when executed by the one or more processors, causes the system to:
   receive a request for a trip including a first departure date for a first bound of the trip and a second departure date for a second bound of the trip;
   in response to receiving the request, generate a plurality of suggested recommendations corresponding to both the first bound and the second bound of the trip;
   store the suggested recommendations corresponding to the first bound and the second bound in a memory, wherein the suggested recommendations corresponding to the second bound coincide to a subset of the suggested recommendations corresponding to the first bound published for display;
   publish the suggested recommendations corresponding to the first bound with departure times of travel conveyances servicing the first bound on the first departure date for display to a user;
   in response to receiving an input that indicates a selected recommendation for the first bound, determine whether the selected recommendation is one of the subset of the suggested recommendations corresponding to the first bound, the input identifying a specific departure time on the first departure date of a travel conveyance published with the selected recommendation for the first bound;
   in response to the selected recommendation being one of the recommendations of the subset of recommendations, retrieve the suggested recommendations corresponding to the second bound from the memory; and
   publish the suggested recommendations corresponding to the second bound for display to the user.

2. The system of claim 1 wherein the program code, when executed by the one or more processors, further causes the system to:
   in response to the selected recommendation being different than one of the recommendations of the subset of recommendations, calculate an alternative set of recommendations for the second bound that correspond to the selected recommendation for the first bound; and
   publish the alternative set of recommendations for the second bound for display to the user.

3. The system of claim 1 wherein the subset of the suggested recommendations corresponding to the first bound is based on a percentage of instances when the suggested recommendations corresponding to the second bound from the memory are published instantaneously in response to receiving the input that indicates the selected recommendation for the first bound.

4. The system of claim 1 wherein the program code, when executed by the one or more processors, further causes the system to:
   determine a quantity, wherein the quantity represents a number of the recommendations corresponding to the second bound that need to be determined such that the suggested recommendations corresponding to the second bound from the memory are published instantaneously in response to receiving the input that indicates a selected recommendation for the first bound.

5. The system of claim 1 wherein the program code, when executed by the one or more processors, further causes the system to:
   store the suggested recommendations corresponding to the first bound and the second bound to the memory for a predetermined amount of time, wherein the predetermined amount of time is adjustable.

6. The system of claim 5 wherein the predetermined amount of time is based on an average time of a conversation with the user on a website and a volatility of availability data for the trip.

7. The system of claim 1 wherein the first bound an outbound portion of the trip, the second bound is an inbound portion of the trip, and the trip is a round-way trip.

8. The system of claim 1 wherein the program code, when executed by the one or more processors, further causes the system to:
   in response to receiving another input that indicates another selected recommendation for the second bound, update the suggested recommendations corresponding to the first bound that are published for display to the user.

9. The system of claim 1 wherein the selected recommendation for the first bound is saved to the memory as a specific key.

10. A method of generating recommendations for a trip, the method comprising:
    receiving, by a computer, a request for the trip including a first departure date for a first bound of the trip and a second departure date for a second bound of the trip;
    in response to receiving the request, generating, by the computer, a plurality of suggested recommendations for both the first bound and the second bound of the trip;
    storing the suggested recommendations corresponding to the first bound and the second bound in a memory of the computer, wherein the suggested recommendations corresponding to the second bound coincide to a subset of the suggested recommendations corresponding to the first bound published for display;

publishing the suggested recommendations corresponding to the first bound with departure times of travel conveyances servicing the first bound on the first departure date for display to a user;

in response to receiving an input that indicates a selected recommendation for the first bound, determining, by the computer, whether the selected recommendation is one of the subset of the suggested recommendations corresponding to the first bound, the input identifying a specific departure time on the first departure date of a travel conveyance published with the selected recommendation for the first bound;

in response to the selected recommendation being one of the recommendations of the subset of recommendations, retrieving the suggested recommendations corresponding to the second bound from the memory of the computer; and publishing the suggested recommendations corresponding to the second bound for display to the user.

11. The method of claim 10 further comprising:
in response to the selected recommendation being different than one of the recommendations of the subset of recommendations, calculating, by the computer, an alternative set of recommendations for the second bound of the trip that correspond to the selected recommendation for the first bound; and
publishing the alternative set of recommendations for the second bound of the trip for display to the user.

12. The method of claim 10 wherein the subset of the suggested recommendations corresponding to the first bound is based on a percentage of instances when the suggested recommendations corresponding to the second bound from the memory of the computer are published instantaneously in response to receiving the input that indicates the selected recommendation for the first bound.

13. The method of claim 12 further comprising:
determining a quantity by the computer, wherein the quantity represents a number of the recommendations corresponding to the second bound that need to be determined by the computer such that the suggested recommendations corresponding to the second bound from the memory of the computer are published instantaneously in response to receiving the input that indicates a selected recommendation for the first bound.

14. The method of claim 10 further comprising:
storing the suggested recommendations corresponding to the first bound and the second bound to the memory of the computer for a predetermined amount of time, wherein the predetermined amount of time is adjustable.

15. The method of claim 14 wherein the predetermined amount of time is based on an average time of a conversation with the user on a web site and a volatility of availability data for the trip.

16. The method of claim 10 wherein the first bound an outbound portion of the trip, the second bound is an inbound portion of the trip, and the trip is a round-way trip.

17. The method of claim 10 further comprising:
in response to receiving another input that indicates another selected recommendation for the second bound, updating, by the computer, the suggested recommendations corresponding to the first bound that are published for display to the user.

18. The method of claim 10 wherein the selected recommendation for the first bound is saved to the memory of the computer as a specific key.

19. A computer program product for generating recommendations for a trip, the computer program product comprising:
a non-transitory computer-readable storage medium; and
program code stored on the non-transitory computer-readable storage medium that, when executed by one or more processors, causes the one or more processors to:
receive a request for the trip including a first departure date for a first bound of the trip and a second departure date for a second bound of the trip;
in response to receiving the request, generate a plurality of suggested recommendations for both the first bound and the second bound of the trip;
store the suggested recommendations corresponding to the first bound and the second bound in a memory, wherein the suggested recommendations corresponding to the second bound coincide to a subset of the suggested recommendations corresponding to the first bound published for display;
publish the suggested recommendations corresponding to the first bound with departure times of travel conveyances servicing the first bound on the first departure date for display to a user;
in response to receiving an input that indicates a selected recommendation for the first bound, determine whether the selected recommendation is one of the subset of the suggested recommendations corresponding to the first bound, the input identifying a specific departure time on the first departure date of a travel conveyance published with the selected recommendation for the first bound;
in response to the selected recommendation being one of the recommendations of the subset of recommendations, retrieve the suggested recommendations corresponding to the second bound from the memory of the computer; and
publish the suggested recommendations corresponding to the second bound for display to the user.

* * * * *